(12) United States Patent
DuBois

(10) Patent No.: US 8,433,635 B1
(45) Date of Patent: Apr. 30, 2013

(54) METHOD AND APPARATUS FOR OPTIMIZING A PORTFOLIO OF FINANCIAL ASSETS

(76) Inventor: Donald DuBois, Portola Valley, CA (US)

( * ) Notice: Subject to any disclaimer, the term of this patent is extended or adjusted under 35 U.S.C. 154(b) by 564 days.

(21) Appl. No.: 12/586,958

(22) Filed: Sep. 29, 2009

Related U.S. Application Data

(63) Continuation-in-part of application No. 12/462,233, filed on Aug. 1, 2009.

(60) Provisional application No. 61/137,969, filed on Aug. 4, 2008.

(51) Int. Cl.
*G09B 19/00* (2006.01)

(52) U.S. Cl.
USPC .......................................... 705/36; 705/36 R

(58) Field of Classification Search ...................... 705/36
See application file for complete search history.

(56) References Cited

U.S. PATENT DOCUMENTS

| | | | |
|---|---|---|---|
| 5,729,700 A | 3/1998 | Melnikoff | |
| 6,832,209 B1 * | 12/2004 | Karp et al. | 705/36 T |
| 7,015,912 B2 | 3/2006 | Marais | |
| 7,062,458 B2 * | 6/2006 | Maggioncalda et al. | 705/36 R |
| 7,366,692 B2 | 4/2008 | Alcaly et al. | |
| 7,590,582 B2 | 9/2009 | Dunne | |
| 7,783,542 B2 | 8/2010 | Horowitz | |
| 2002/0138383 A1 * | 9/2002 | Rhee | 705/36 |
| 2004/0172354 A1 | 9/2004 | Charnley, Jr. | |
| 2006/0253356 A1 | 11/2006 | Charles et al. | |
| 2006/0271466 A1 | 11/2006 | Gorbatovsky | |
| 2007/0033127 A1 | 2/2007 | Masuyama et al. | |
| 2008/0154792 A1 | 6/2008 | Maggioncalda et al. | |

OTHER PUBLICATIONS

International Search Report and Written Opinion dated Oct. 2, 2009, pp. 1-8.
International Preliminary Report on Patentability (Chapter 1 of the Patent Cooperation Treaty) dated Feb. 17, 2011, pp. 1-7.
Non-Final Office Action from U.S. Appl. No. 12/462,233; Dated Sep. 27, 2012, pp. 1-18.

* cited by examiner

*Primary Examiner* — Eric T Wong
*Assistant Examiner* — John Anderson
(74) *Attorney, Agent, or Firm* — Dergosits & Noah LLP; Geoffrey T. Staniford

(57) ABSTRACT

A method and apparatus for optimizing a portfolio of financial assets is disclosed. The method includes computing a risk-return profile for each of a plurality of feasible weight distributions of financial assets in the portfolio and selecting as the optimal distribution the risk-return profile having the greatest annualized total return. Also disclosed is a method for providing a real-time design of a portfolio of financial assets.

16 Claims, 13 Drawing Sheets

METHOD AND APPARATUS FOR OPTIMIZING A PORTFOLIO OF FINANCIAL ASSETS

CROSS REFERENCE TO RELATED APPLICATIONS

The present invention is a continuation in part application of patent application Ser. No. 12/462,233, filed on Aug. 1, 2009 and entitled "Method and Apparatus for Computing and Displaying a Risk-Return Profile as a Risk Measure for Financial Assets" that in turn claims priority from provisional patent application Ser. No. 61/137,969 filed on Aug. 4, 2008 and entitled "Availability Profiles, Factors and Ratios—Risk Metrics for Financial Assets", the entire disclosures of which are incorporated herein by reference.

BACKGROUND OF THE INVENTION

1. Field of the Invention

The present invention relates generally to financial asset risk analysis and more particularly to a method and apparatus for optimizing a portfolio of financial assets.

2. Background Art

Assessing the degree of risk of a financial asset is central to rational financial planning. Investors and analysts have an intuitive idea of what constitutes investment risk, but such risk is a difficult concept to define precisely so that it can be measured and quantified.

There are six main indicators or measures of investment risk that are commonly used and that apply to the analysis of stocks, bonds, mutual funds, exchange traded funds as well as to other financial instruments including portfolios of these assets. The indicators are alpha, beta, R-squared, the Sharpe ratio, relative volatility and the standard deviation. All of these measures depend on, in one way or another, a calculation of the standard deviation of the asset price, or a calculation of the variance of the asset price (which is the square of the standard deviation).

The standard deviation measures the deviations from the mean of the asset price; the greater the deviation from the mean, the greater the volatility of the asset's price. This is the basic rationale for using the standard deviation in calculations of the riskiness of an asset. If an asset's price stays constant, its standard deviation is zero. If the asset's price goes up or down, it deviates from its mean value and the average amount of all the deviations from the mean is approximately what the standard deviation measures. The formula for the standard deviation, $\sigma$, is:

$$\sigma = \sqrt{\frac{1}{N}\sum_{i=1}^{N}(x_i - \bar{x})^2}.$$

where the $x_i$ are the asset prices (or a function of asset prices) and $\bar{x}$ is the mean of the asset prices (or of a function of the asset prices).

Alpha and beta are simply the constant (beta) and slope terms (alpha) of the linear regression of asset return against a benchmark. Alpha ($\alpha$) is the measure of that part of an investment's return that is in excess of the benchmark's index return or the expected portfolio return that it is being compared to. The formula for alpha of a portfolio $\alpha_p$ is:

$$\alpha_p = R_i - (R_f + \beta_p(R_m - R_f))$$

where $R_i$=expected total portfolio return, $R_f$=risk free rate, $\beta_p$=beta of the portfolio, and $R_m$=expected market return.

The beta coefficient is a measure of the volatility of an asset or portfolio in relation to the rest of the financial market. The formula for the beta of an asset is defined as:

$$\beta_a = \frac{\text{Cov}(r_a, r_m)}{\text{Var}(r_m)}$$

where $r_a$=the rate of return of the asset and $r_m$=the rate of return of the overall market to which the asset is being compared. Coy is the covariance and Var is the variance of their respective parameters.

By definition, the market itself has an underlying beta of 1.0 and individual stocks are ranked according to how much they deviate from the macro market (for simplicity purposes, the S&P 500 is usually used as a proxy for the market as a whole). A stock that goes up or down more than the market over time (i.e. more volatile) has a beta whose absolute value is above 1.0. If a stock moves less than the market, the absolute value of the stock's beta is less than 1.0. Higher-beta stocks mean greater volatility and are therefore considered to be riskier, but are in turn supposed to provide a potential for higher returns; low-beta stocks pose less risk but also lower returns.

The Sharpe Ratio, or Sharpe index, or Sharpe measure of reward-to-variability ratio is a measure of the excess return (or Risk Premium) per unit of risk in an investment asset or a trading strategy. It is defined as:

$$S = \frac{E[R - R_f]}{\sigma} = \frac{E[R - R_f]}{\sqrt{\text{var}[R - R_f]}}$$

where R=the asset return, $R_f$=the return of a benchmark asset, such as the risk free rate of return, $E[R-R_f]$=the expected value of the excess of the asset return over the benchmark return, and $\sigma$ is the standard deviation of the excess return. The Sharpe ratio is used to characterize how well the return of an asset compensates the investor for the risk taken. When comparing two assets each with the expected return E[R] against the same benchmark with the same return $R_f$, the asset with the higher Sharpe ratio gives more return for the same risk. Investors are often advised to pick investments with higher Sharpe ratios.

The R-squared statistic measures how well one asset is correlated with another asset or the market as a whole. An R-squared value of 1.0 indicates a perfect correlation, a value of 0 indicates no correlation and a value of −1 a perfect negative correlation. The formula for R-squared of two assets X and Y is:

$$r(X,Y) = \text{Cov}(X,Y)/\sigma_x\sigma_y$$

where Cov{X,Y}=the covariance of X and Y and $\sigma_x\sigma_y$=the standard deviation of X multiplied by the standard deviation of Y.

The Relative Volatility Statistic is the ratio of the standard deviation of the asset return rate (or function of the return rate) divided by the standard deviation of the market return that the asset is being compared to. The formula for Relative Volatility of an asset is:

Relative Volatility(Asset)=*SD*(Asset Return)/*SD*(Market Return)

where SD(Asset Return)=the standard deviation of the asset return and SD(Market Return)=the standard deviation of the market return.

As previously noted, each of the described prior art risk measures use a calculation of the standard deviation of the asset price or a calculation of the variance of the asset price as a core component of the risk calculation. Disadvantageously, these prior art risk measures do not adequately describe two essential components of risk of a financial asset; the range of total return component and an asset hold time component. Consequently the range and variability of total returns of an asset and the likelihood that returns from the held asset will be available at a specific time are not provided by these risk measures.

By way of illustration, the total return 100 of an asset X is graphed as it changes over time in FIG. 1. The total return 200 of an asset Y is graphed as it changes over time in FIG. 2. The period of the graph of the total return 200 of asset Y is half that of the graph of the total return 100 of asset X. Therefore, if the total return of asset Y is in the negative total return region (below the horizontal axis), asset Y will recoup its initial value in half the time as compared to asset X. For this reason, asset Y is considered to be less risky than asset X. The mean total return for each asset is zero and coincides with the horizontal axis. However, the standard deviation for both assets is the same (0.711), thus showing that the standard deviation does not measure the frequency of change.

The standard deviation also does not take into account the direction of movement of an asset's total return and thus does not provide a measure of this intuitive notion about the riskiness of an asset's total return. With reference to FIG. 3, the total return 300 of an asset A is graphed as it changes over time. The total return 400 of an asset B is graphed as it changes over time in FIG. 4. The total return 300 of asset A starts at zero, goes up to 100%, goes back to zero, goes up to 100%, and then returns to zero. In the same time period, the total return 400 of asset B starts at zero, goes up to 100%, goes back to zero, goes down to 50%, and then return to zero. The standard deviation of both graphs is 0.548. Clearly, investing in asset B is riskier than investing in asset A because there is a substantial negative total return of 50% while the total return of asset A is never negative. The standard deviation does not distinguish between the degree of riskiness of assets A and B despite the fact that their total return volatilities are remarkably different.

By definition, the standard deviation does not distinguish between positive and negative deviations from the mean. A deviation below the mean is the same as a deviation above the mean because the deviation is squared in the standard deviation formula. However, an asset having a declining total return is generally considered riskier than an asset having an increasing total return.

The inability of the standard deviation to provide a measure of the direction of the deviations from the mean is illustrated in FIG. 5. The increasing asset price 500 of an asset C and the decreasing asset price 510 of an asset D are graphed as they change over time. Each graph has a standard deviation of 4.13 even as the price of asset C doubles and the price of asset D goes to zero.

Finally, the standard deviation is a mean-centric statistic that always underestimates the volatility of the price and total return of an asset. As the standard deviation measures approximately the average deviation from the mean, it does not measure the range or extremes of price and total return movements of an asset. Information regarding such range and extremes is of value in assessing the riskiness of an asset because investment in assets having wide extremes entails the greatest risk and potentially the greatest loss to the investor.

By way of example, and with reference to FIG. 6, the asset price 600 of an asset E is graphed as it changes over time. The graph shows three cyclical changes in the asset price 600 starting from an acquisition price of 2.0, increasing to a price of 3.0, decreasing to a price of 1.0 and then increasing to the acquisition price of 2.0. The hold time for asset E consists of three such cycles. The mean asset price for the duration of the asset hold time is 2.0. The standard deviation, since it measures deviation from the mean, will measure the greatest deviation as 1.0 from the mean 2.0. However, the greatest drawdown, from the high price of 3.0 to the low price of 1.0, is a potential loss of 2.0. If asset E is acquired at a local maximum, the potential loss is two-thirds of its value, a value greater than any deviation from the mean indicates. An investor acquiring asset E, using prior art risk measures based on the standard deviation, would have no means of knowing the volatility of the asset's price or of the magnitude of the potential loss.

Prior art risk measures based on the standard deviation thus suffer many disadvantages. Such measures do not provide complete information related to the variability of total returns of an asset or portfolio and the likelihood that returns from the asset or portfolio will be available at a specific time. Furthermore, such measures do not take into account the direction of movement of an asset's price or of a portfolio's unit price. Finally, prior art risk measures underestimate the volatility of an asset's price and of a portfolio's unit price.

SUMMARY OF THE INVENTION

The present invention provides a method and apparatus for optimizing a portfolio of financial assets. The method includes computing a risk-return profile for each of a plurality of feasible weight distributions of financial assets in the portfolio and selecting as the optimal distribution the risk-return profile having the greatest annualized total return subject to any specified constraints.

The risk-return profile of the invention provides a multidimensional risk metric having a range of total return component and an asset hold time component. The risk-return profile graphically depicts the riskiness of holding an asset for a plurality of asset hold times.

The range of total return component quantifies the mean total return and the average negative return for a given asset hold time. The asset hold time component provides hold times of various durations. Together, they answer the twin questions, "How much can one expect from an asset, and when can one expect that return".

The range of total return component of risk is clearly an element of the degree of riskiness of an asset. If an asset price can go to zero (a loss of 100%) that asset will be seen to be more risky than another asset that can only lose half its value. Any measure of asset risk must contain a component that describes, in a quantitative way, the range of negative and positive returns that are possible while holding a financial asset.

The asset hold time component of risk is an essential component of risk as well. The price of an asset fluctuates and can decline for many years before returning to its previous price. Investment in assets having a price that takes longer to rebound to the previous price is considered to be riskier than an investment in assets having a price that bounces back more quickly. Furthermore, an asset that takes five years to return to its long term growth rate is more risky than an asset that takes only a year to return to its long term growth rate.

By way of example, the price performance of assets G and H is shown graphically in FIG. 7 and FIG. 8 respectively. Asset G and asset H have identical long term annualized growth rates represented by the straight line 700. However, the price fluctuations 800 of asset H are twice as frequent as the price fluctuations 710 of asset G. Therefore, if asset H is in a downward trend, i.e. below its long term annual growth rate as represented by the straight line, it will return, on average, in half the time to its long term growth rate as compared to asset G. Asset H is therefore less risky then asset G because it bounces back from a downward trend more quickly. All other things being equal, the funds from asset H are more likely to be available when needed than the funds from asset G.

The method and apparatus in accordance with an aspect of the invention provide a risk-return profile that displays quantitatively the range of the total return of an asset, including a mean annualized total return and an average negative total return as a function of the asset hold time.

A portfolio may be comprised of stocks, bonds, mutual funds, exchange traded funds as well as other financial instruments. These financial assets are combined in the portfolio and each has an associated weight such that the associated weight provides the relative proportion of each financial asset within the portfolio. If there are n financial assets in the portfolio having respective weights of $w_1, w_2 \ldots, w_n$ (where $\Sigma w_i = 1$ for $i=1 \ldots n$) and the n financial assets have unit prices of $p_1, p_2 \ldots, p_n$ on a given day, then a portfolio unit price $p = \Sigma w_i p_i$ for $i=1 \ldots n$ for that day. As the unit prices vary from trading day to trading day, the portfolio unit price p varies to provide a date range set of varying values from which a risk-return profile may be computed as further described herein.

In another aspect of the invention, a computer implemented method for optimizing a portfolio of financial assets includes the steps of (a) defining a value deltaPercent, wherein deltaPercent and integer multiples thereof provide a quantitative relationship between the possible weights assumable by each financial asset in the portfolio; (b) defining a set of possible weights for each financial asset in the portfolio; (c) determining a feasible weight set from the sets of possible weights, the elements of the feasible weight set including sub-sets having as elements possible weights such that the possible weights sum to 1; (d) computing a risk-return profile for each element of the feasible weight set; and (e) selecting the risk-return profile having the greatest mean annualized total return.

In another aspect of the invention, an apparatus for optimizing a portfolio of financial assets includes a processor and a display device coupled thereto, wherein the processor is configured to: (a) define a value deltaPercent, wherein deltaPercent and integer multiples thereof provide a quantitative relationship between the possible weights assumable by each financial asset in the portfolio; (b) define a set of possible weights for each financial asset in the portfolio; (c) determine a feasible weight set from the sets of possible weights, the elements of the feasible weight set including sub-sets having as elements possible weights such that the possible weights sum to 1; (d) compute a risk-return profile for each element of the feasible weight set; and (e) select the risk-return profile having the greatest mean annualized total return.

In another aspect of the invention, a computer implemented method for providing a real-time design of a portfolio of financial assets includes the steps of (a) receiving a user-selected weight distribution of the financial assets in the portfolio; (b) computing and displaying a risk-return profile for the user-selected weight distribution; (c) determining whether any one of a plurality of user-selected constraints are violated; and (d) displaying the results of step (c) in a user interface.

In another aspect of the invention, an apparatus for providing a real-time design of a portfolio of financial assets includes a processor and a user interface coupled thereto, wherein the processor is configured to: (a) receive a user-selected weight distribution of the financial assets in the portfolio; (b) compute and display a risk-return profile for the user-selected weight distribution; (c) determine whether any one of a plurality of user-selected constraints are violated; and (d) display the results of step (c) in the user interface.

In another aspect of the invention, the risk-return profile is a bar graph.

In another aspect of the invention, the risk-return profile is a table.

In another aspect of the invention, the risk-return profile includes a worst case total return as a function of the asset hold time.

In another aspect of the invention, the risk-return profile displays a percentile of the plurality of total returns as a function of the asset hold time to provide a risk tolerance level.

In another aspect of the invention, the risk-return profile displays a time to recoupment of an investment in an asset.

In another aspect of the invention, the risk-return profile displays annualized positive total returns and cumulative negative total returns as a function of the asset hold time.

In another aspect of the invention, the risk-return profile displays how performance measures of an asset change as a function of the asset hold time.

In another aspect of the invention, the risk-return profiles of a plurality of assets can be compared to each other or to the market as a whole to determine the comparative riskiness of each of the plurality of assets.

In another aspect of the invention, the risk-return profile displays a conditional multidimensional risk metric.

There has been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended herein.

In this respect, before explaining at least one embodiment of the invention in detail, it is to be understood that the invention is not limited in its application to the details of design and to the arrangement of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other methods and apparatus for carrying out the several purposes of the present invention. It is important, therefore, that the claims be regarded as including such equivalent methods and apparatus insofar as they do not depart from the spirit and scope of the present invention.

BRIEF DESCRIPTION OF THE DRAWINGS

The present disclosure may be better understood and its numerous features and advantages made apparent to those skilled in the art by referencing the accompanying drawings wherein.

DETAILED DESCRIPTION OF THE INVENTION

The present invention provides a method for optimizing a portfolio of financial assets. The method includes computing a risk-return profile for each of a plurality of feasible, weight distributions of financial assets in the portfolio and selecting as the optimal distribution the risk-return profile having the greatest annualized total return subject to any specified constraints. In describing the risk-return profile, the following definitions apply.

A financial asset or asset includes any financial instrument including, but not limited to, stocks, mutual funds, exchange traded funds, bonds, options and futures contracts. An asset also includes a portfolio of such financial assets.

A period is a fixed time duration such as two weeks, six months or one year.

An interval is a length of time that comprises an integer number of periods. For example, given a period of six months, an interval includes six months, twelve months, eighteen months and so on.

An asset hold time is measured in intervals.

The asset price and net asset price are synonymous.

The total return of an asset is the change in the asset price plus any income including interest, dividends and distributions. The total return is expressed as a percentage gain or loss of the original amount invested in the asset.

Figure 1:
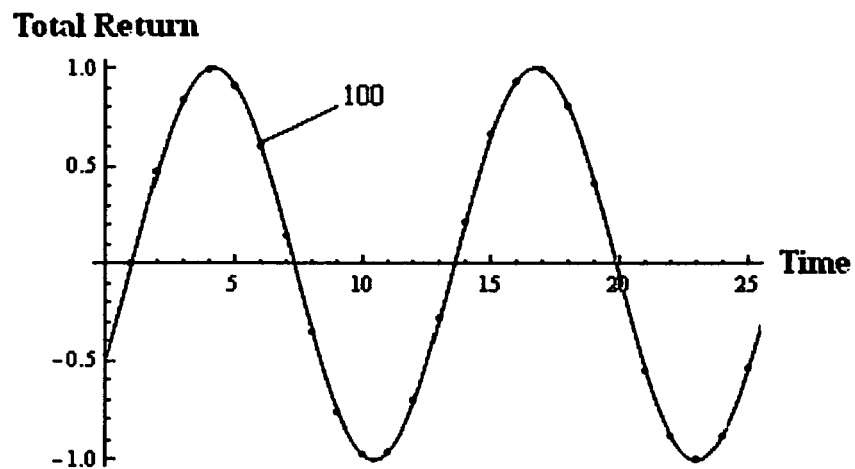
FIG. 1 is a graph showing the total return of an asset X over time.
Figure 2:
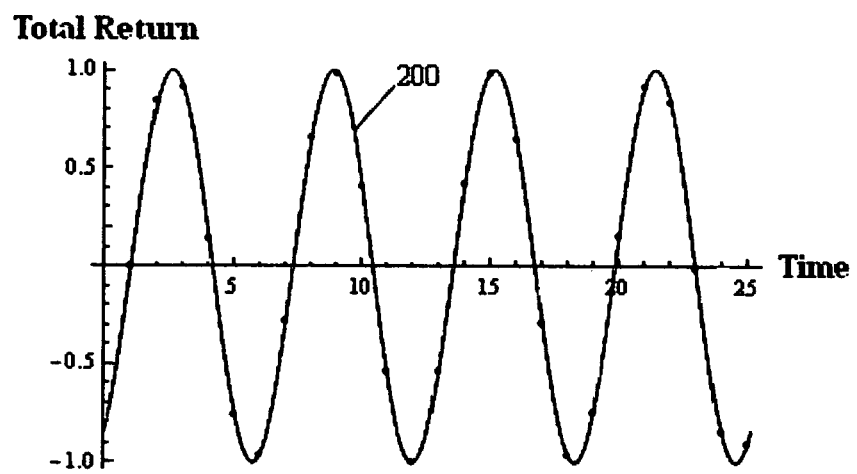
FIG. 2 is a graph showing the total return of an asset Y over time, the graph having a period half that of the period of the graph of FIG. 1.
Figure 3:
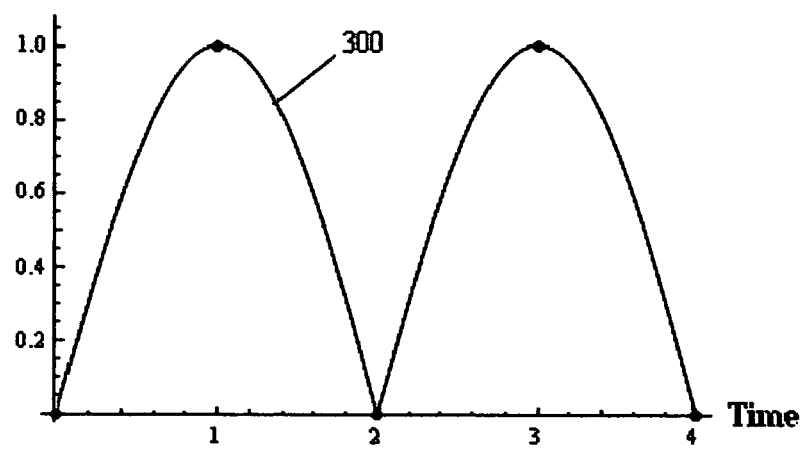
FIG. 3 is a graph showing the total return of an asset A over time, the total return of the asset A never being negative.
Figure 4:
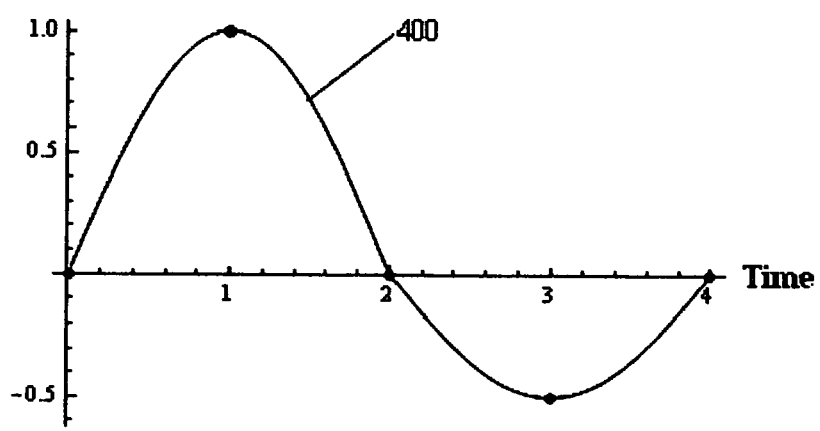
FIG. 4 is a graph showing the total return of an asset B over time, the total return of the asset B being negative for half of its period.
Figure 5:
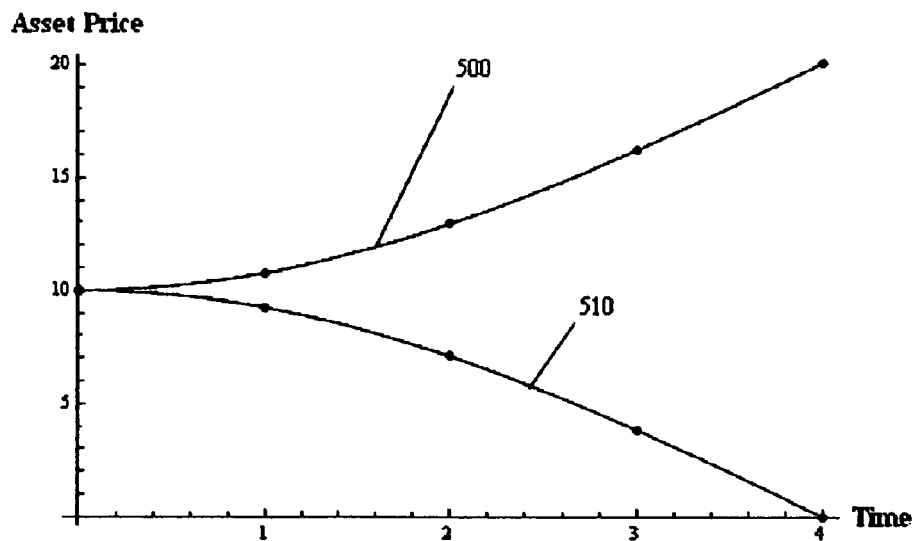
FIG. 5 is a graph showing the asset price of two assets C and D over time, the asset price of asset C increasing over time and the asset price of asset D decreasing over time.
Figure 6:
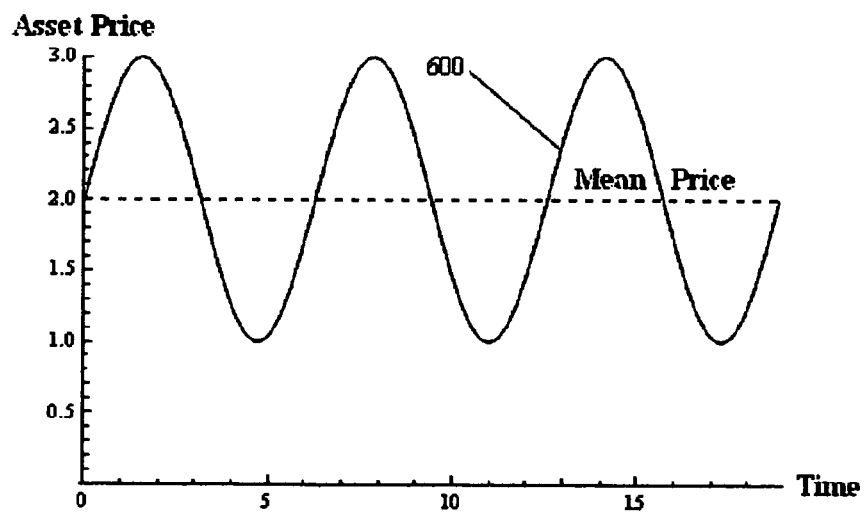
FIG. 6 is a graph showing the asset price of an asset E as it changes over time.
Figure 7:
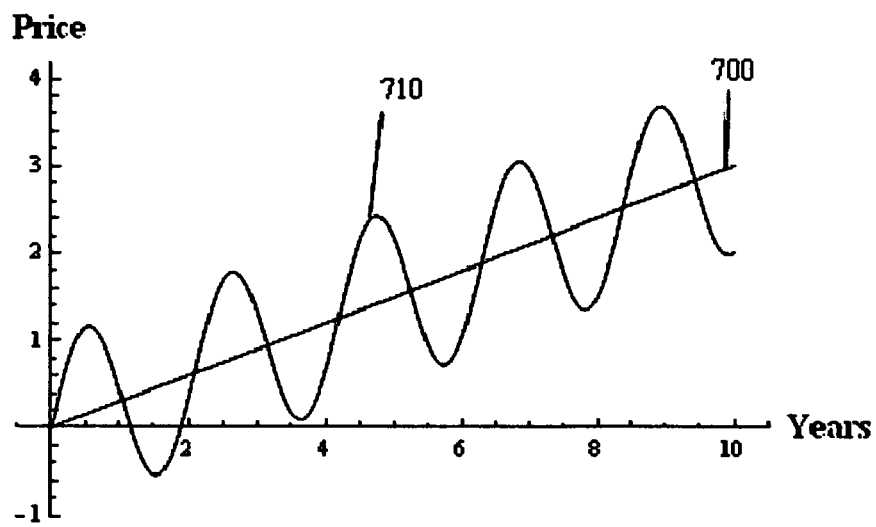
FIG. 7 is a graph showing the price of an asset G as it changes over time.
Figure 8:
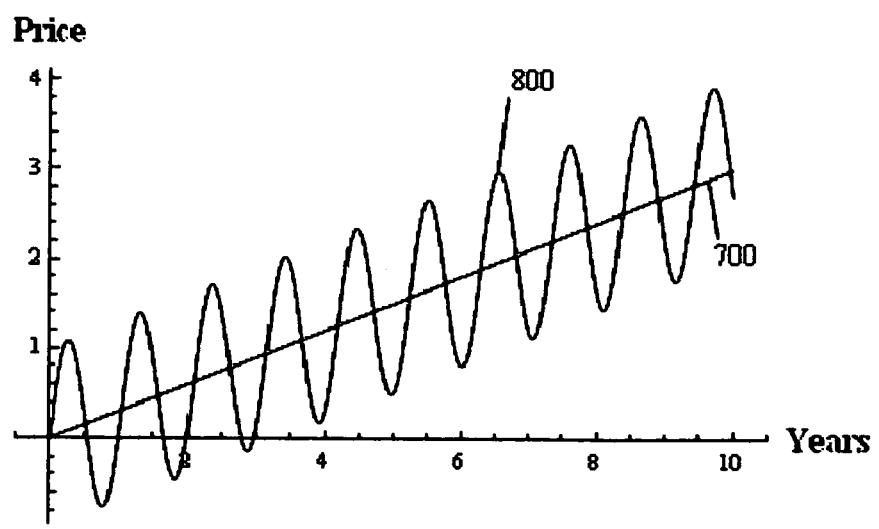
FIG. 8 is a graph showing the price of an asset H as it changes over time, the graph having a period half that of the period of the graph of FIG. 7.
Figure 9:
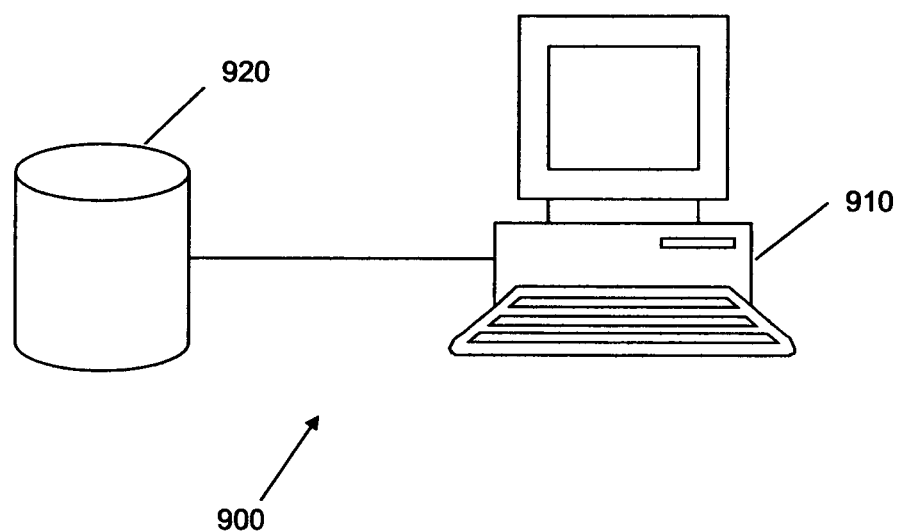
FIG. 9 is a schematic representation of an apparatus capable of implementing a method of displaying a financial asset risk-return profile in accordance with the invention.

The inventive method for computing and displaying a financial asset risk-return profile may be executed by a computing machine generally designated 900 in FIG. 9. Computing machine 900 may be of conventional design and capable of performing computations on large sets of data accessible from a local memory or from a communicatively coupled database 920. Computing machine 900 may be a personal computer or a server machine coupled to a communications network such as the Internet.

The computations performed by the computing machine 900 provide the metrics of the risk-return profile. The computing machine 900 is further capable of displaying the risk-return profile to a user viewing a display device 930. As is well known in the art, the computing machine 900 may have other capabilities that include a printing facility to print the risk-return profile, a formatting facility for formatting and saving the risk-return profile to the local memory, and a communication facility for sending the risk-return profile to another computing machine 900 over the communications network.

In accordance with an aspect of the method of the invention, the metrics of the risk-return profile are computed from a date range set stored in the local memory or database 920. The elements of the date range set may be the ordered net asset values of an asset at the close of each trading day. For purposes of illustration, the date range set of the Vanguard Index Trust 500 Index fund (hereinafter the VFINX date range set) from Mar. 3, 1990 through Jun. 30, 2008 is used herein. The date range set spans a time period of 18.34 years.

Figure 10:
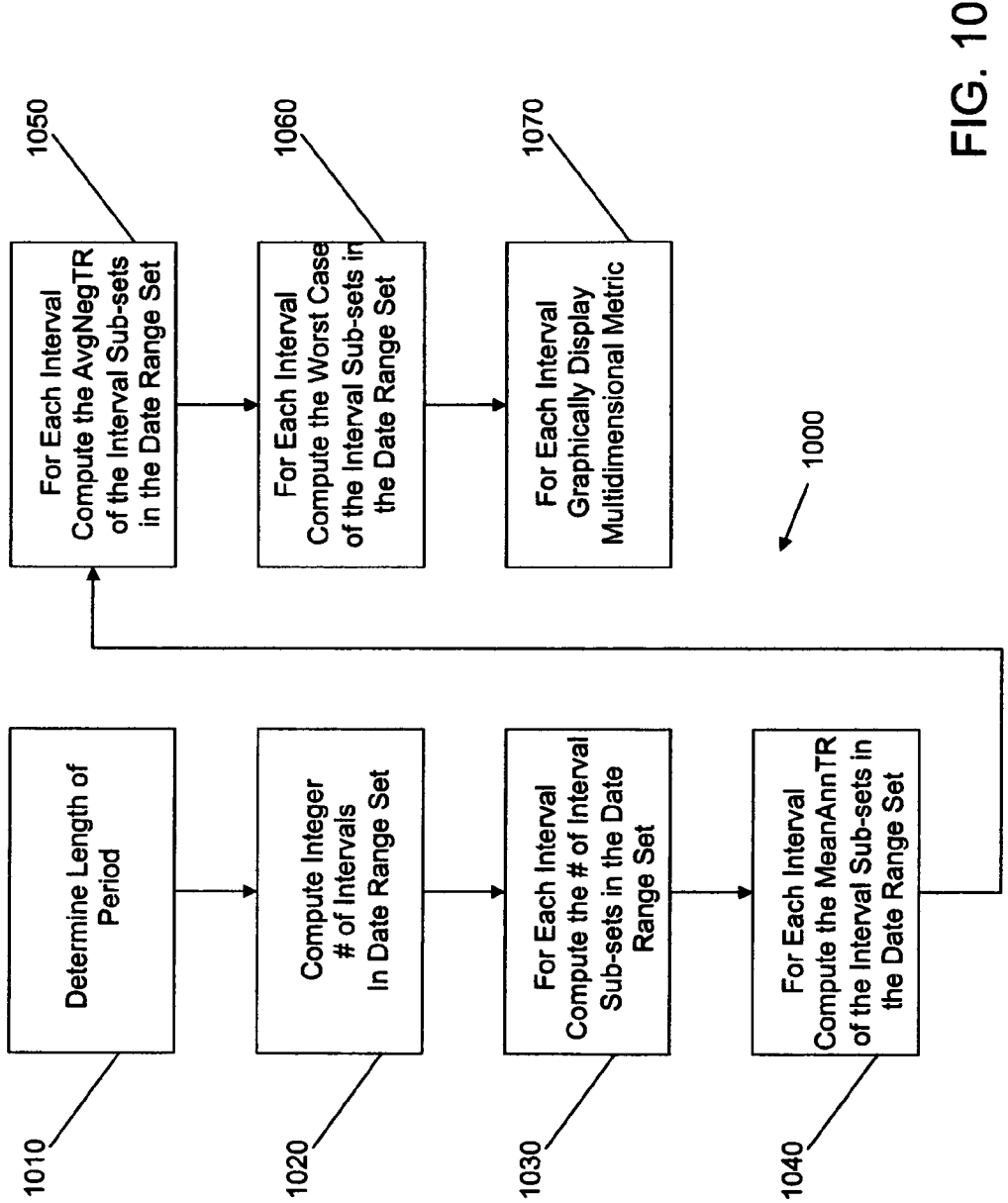
FIG. 10 is a flow chart illustrating a method for displaying a financial asset risk-return profile in accordance with the invention.

A method generally designated 1000 for displaying a financial asset risk-return profile is shown in FIG. 10. Method 1000 is preferably implemented by the computing machine 900 and in this sense is a computer-implemented method. Method steps shown in FIG. 10 may be implemented by the computing machine 900 as by the execution of instructions and/or code segments by a processor the outcome of which is the performance of a method step.

In a step 1010, the time duration or length of a period is determined. The time duration of the period may be user-selected or a default value. For purposes of illustration, a period of one year is used herein. An integer number of intervals in the date range set are computed in a step 1020. The integer number of intervals is 18 for the period of one year and the VFNIX date range set spanning 18.34 years. A first interval spans one year, a second interval spans two years and so on. As the asset hold time is measured intervals, there are 18 asset hold times including a one year asset hold time, a two year asset hold time and so on up to, and including, an eighteen year asset hold time.

For each interval, the number of interval sub-sets in the date range set is computed in a step 1030. An interval sub-set spans the length of the interval and represents one of a plurality of possible asset hold times. The set of interval sub-sets represents the plurality of possible asset hold times. For the VFNIX date range set, there are 4370 interval sub-sets having a length of one year, 4118 interval sub-sets having a length of two years and so on. For each interval, the interval sub-sets provide a plurality of sets of data representing equal hold times throughout the date range set.

In a step 1040, for each interval the mean annualized total return of the interval sub-sets in the date range set is computed. The annualized total return of each interval sub-set is given by $$annTR = e^{[Ln(TR+1)/nYrs]} - 1.0$$

where annTR=the annualized total return of an interval sub-set, TR=the total return for the interval sub-set, and nYrs=the length of the interval sub-set in years. Ln(TR+1) is the natural logarithm of TR+1 and e is the mathematical constant defined as the base of the natural logarithm, sometimes referred to as Euler's number. The mean annualized total return is determined from the annualized total returns of the interval sub-sets. Execution of step 1040 thus provides a mean annualized total return for each interval or asset hold time.

For each interval, the average negative total return of the interval sub-sets is computed in a step 1050. The average negative total return is the average of the total returns of interval sub-sets having a negative value and answers the question: "If there are one or more negative total returns for a given interval, what is the average value of the negative total returns." If there are n negative total returns for a given interval (corresponding to n interval sub-sets having a negative total return), then $$avgNegTR = (TR_1 + TR_2 + \ldots TR_n)/n$$

where avgNegTR=the average negative total return and the $TR_1, TR_2 \ldots TR_n$ are the negative total returns of the interval sub-sets. The average negative total return is a cumulative total return which is never annualized so that the magnitude of a potential loss is not masked by an annualized value.

In a step 1060, for each interval, the worst case total return of the interval sub-sets is computed. The worst case total return is $$\text{worst case } TR = \min(TR_1, TR_2, \ldots TR_m)$$

where worst case TR=the worst case TR and $\min(TR_1, TR_2, \ldots TR_m)$=the minimum value of the total returns of the interval sub-sets. The worst case total return may be negative or positive. In the case where the worst case total return is positive, its value is annualized. Otherwise, the value is not annualized. The worst case total return is cumulative if its value is negative so that the magnitude of a potential loss is not masked by an annualized value.

Figure 11:
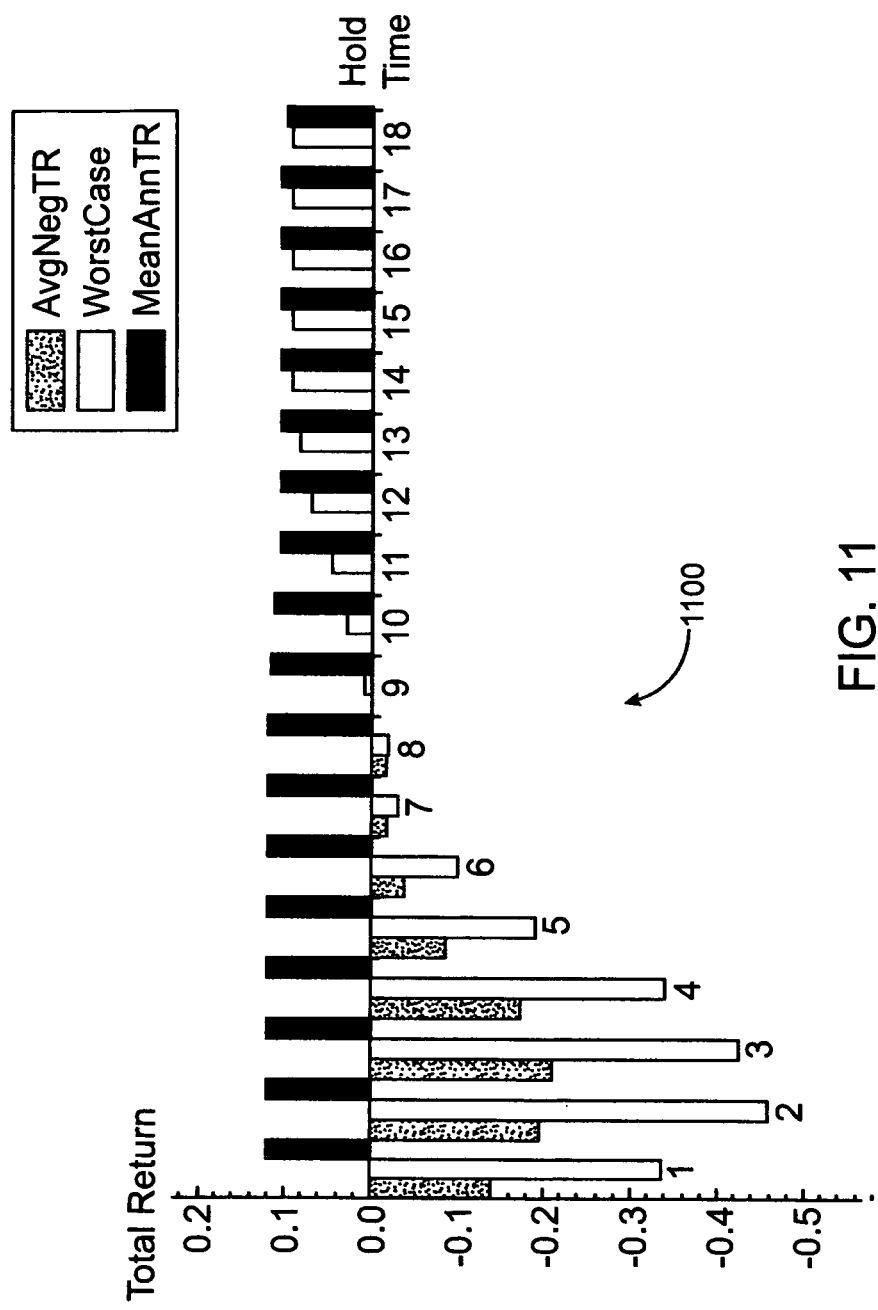
FIG. 11 is a schematic representation of a risk-return profile in accordance with the invention.

The metrics computed in steps 1040, 1050 and 1060 (the mean annualized total return, the average negative total return and the worst case total return of an asset) are graphically displayed for each interval or asset hold time in a step 1070. The metrics are graphically displayed in a risk-return profile 1100 of an asset as shown in FIG. 11. The risk-return profile 1100 includes a bar graph having a total return axis and an asset hold time axis. For each asset hold time, the computed mean annualized total return, average negative total return and worst case total return are graphed. A table corresponding to the metrics graphically displayed in the risk-return profile 1100 (Table 1) may also be graphically displayed. Table 1 displays additional information including what an investment of $100 would grow to, on average, at the end of each asset hold period (GR-100) and the percentage of time that, for a given asset hold time, there was a negative total return.

TABLE 1

| | Interval Yrs. | Ann TR | Gr-100. | # Intervals | Avg. Neg. TR | % Neg TR | Worst Case |
|---|---|---|---|---|---|---|---|
| 1 | 1.00 | 0.12 | 112.00 | 4370 | −0.14 | 0.18 | −0.33 |
| 2 | 2.00 | 0.12 | 126.22 | 4118 | −0.19 | 0.17 | −0.46 |
| 3 | 3.00 | 0.13 | 142.73 | 3866 | −0.21 | 0.17 | −0.42 |
| 4 | 4.00 | 0.13 | 161.27 | 3614 | −0.17 | 0.20 | −0.34 |
| 5 | 5.00 | 0.13 | 182.63 | 3362 | −0.08 | 0.21 | −0.19 |
| 6 | 6.00 | 0.12 | 202.35 | 3110 | −0.04 | 0.09 | −0.10 |
| 7 | 7.00 | 0.12 | 225.67 | 2858 | −0.02 | 0.00 | −0.03 |
| 8 | 8.00 | 0.12 | 250.27 | 2606 | −0.02 | 0.00 | −0.02 |
| 9 | 9.00 | 0.12 | 274.95 | 2354 | 0.00 | 0.00 | 0.01 |
| 10 | 10.00 | 0.11 | 293.32 | 2102 | 0.00 | 0.00 | 0.03 |
| 11 | 11.00 | 0.11 | 308.36 | 1850 | 0.00 | 0.00 | 0.05 |
| 12 | 12.00 | 0.11 | 333.80 | 1598 | 0.00 | 0.00 | 0.07 |
| 13 | 13.00 | 0.11 | 376.53 | 1346 | 0.00 | 0.00 | 0.08 |
| 14 | 14.00 | 0.11 | 417.03 | 1094 | 0.00 | 0.00 | 0.09 |
| 15 | 15.00 | 0.11 | 461.50 | 842 | 0.00 | 0.00 | 0.09 |
| 16 | 16.00 | 0.11 | 516.76 | 590 | 0.00 | 0.00 | 0.09 |
| 17 | 17.00 | 0.11 | 582.06 | 338 | 0.00 | 0.00 | 0.09 |
| 18 | 18.00 | 0.10 | 559.10 | 86 | 0.00 | 0.00 | 0.09 |

The risk-return profile 1100 provides a graphical depiction of the riskiness of holding an asset over the plurality of hold times and includes the total return component and the asset hold time component of risk. By utilizing the maximum amount of information related to an asset's historical price movement, the risk-return profile 1100 provides both the amount of return and when the return can be expected. For example, the risk-return profile 1100 shows that the unluckiest investor would be required to hold the Vanguard Index Trust 500 Index fund for nine years to return to parity as the worst case total return becomes a positive value after the asset hold time of nine years.

In accordance with another aspect of the method of the invention, a risk tolerance level can be graphically displayed in a risk-return profile. The worst case total return of the risk-return profile 1100 quantifies the most negative total return for an asset hold time. It represents the most pessimistic scenario about what has happened to the asset's total return over the historical period covered by the risk-return profile 1100. For planning purposes, this may not be the most useful view of the data covered by the risk-return profile 1100 as it may represent too pessimistic a view going forward.

Figure 12:
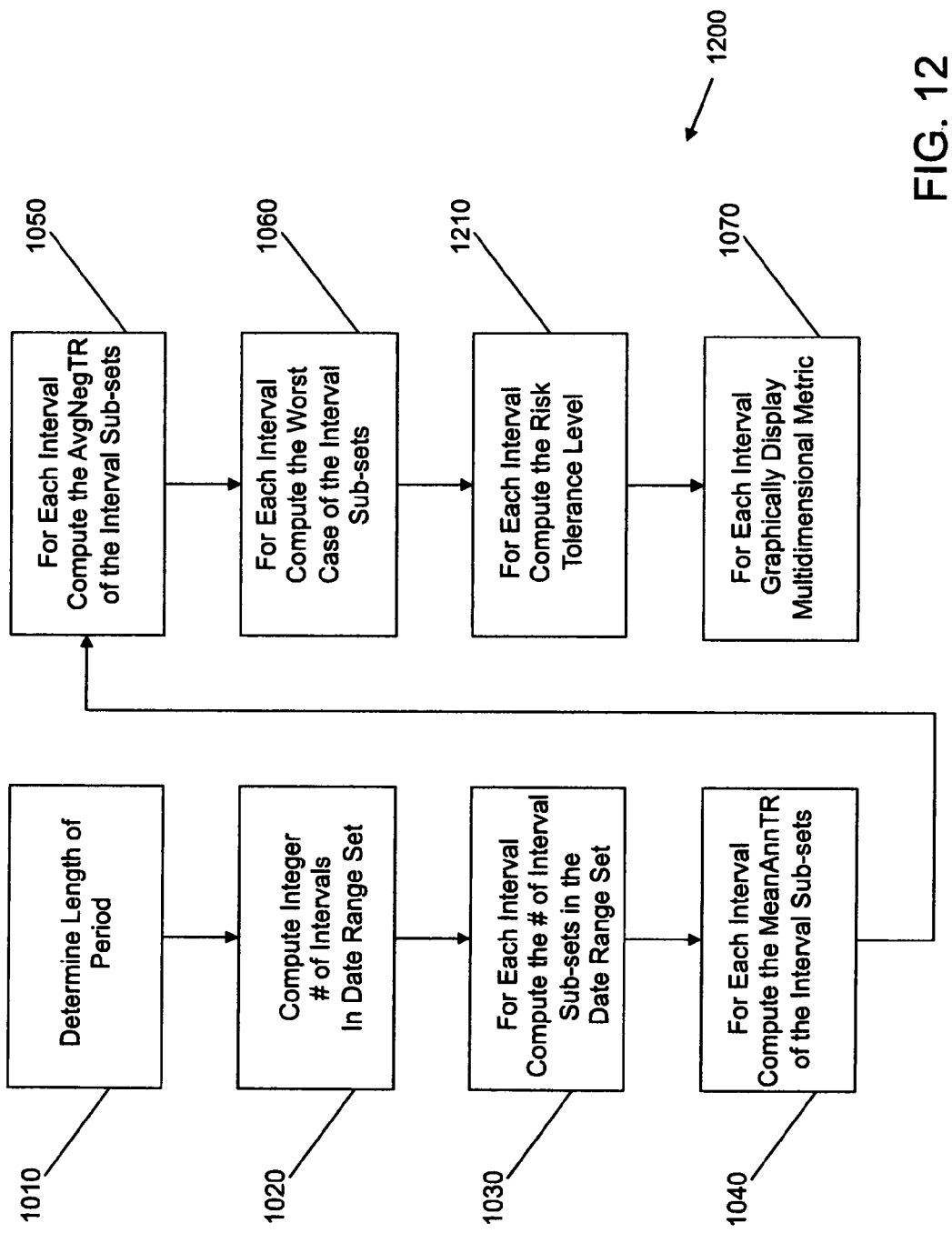
FIG. 12 is a flow chart illustrating a method for displaying a risk tolerance level in the risk-return profile in accordance with the invention.
Figure 13:
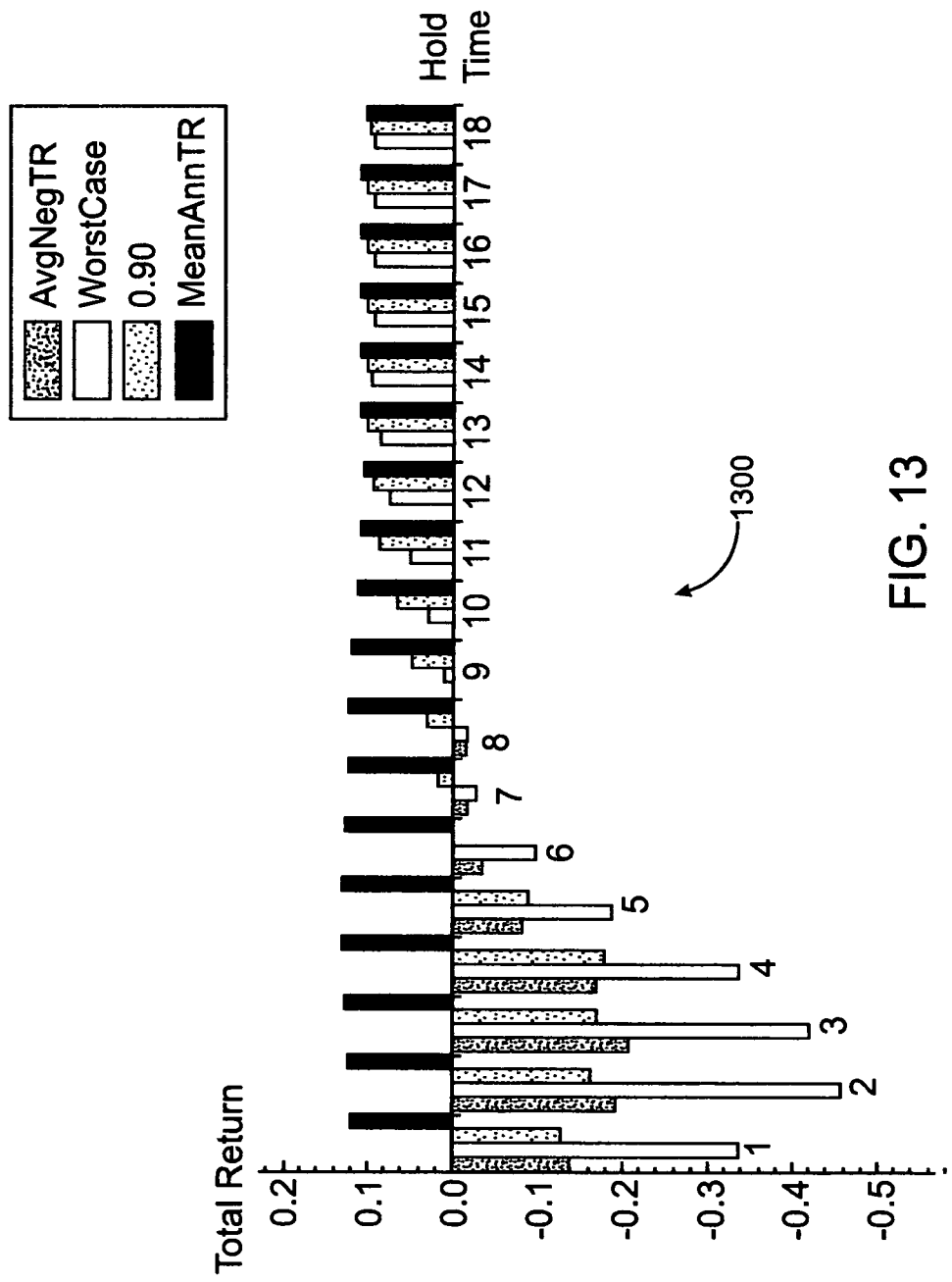
FIG. 13 is a schematic representation of the risk-return profile showing the risk tolerance level in accordance with the invention.

With reference to FIG. 12, a method generally designated 1200 for displaying a risk tolerance level includes the method steps of the method 1000 and an additional step 1210 in which a risk tolerance level is computed. An exemplary risk tolerance level of 90% is graphically displayed in a risk-return profile 1300 as shown in FIG. 13 and numerically shown in Table 2. The values represented by the bars designated "0.90" are computed by finding the total return that represents the $90^{th}$ percentile of all total returns of the interval sub-sets for a given asset hold time or interval. This total return is the total return for which, out of all the total returns for a given hold time, only 10% are less than the $90^{th}$ percentile total return. In general, if TR is the total return that represents the X-th percentile this implies that (100−X) % of all the total returns for the given hold time are less than TR. In this case, X % is referred to as the "risk tolerance level" or, in shorthand, simply the risk level. If TR is negative, the value is displayed as a cumulative total return, otherwise it is annualized.

TABLE 2

| | Interval Yrs. | Ann TR | Gr-100. | # Intervals | Avg. Neg. TR | % Neg TR | Worst Case | Pct. 0.90 |
|---|---|---|---|---|---|---|---|---|
| 1 | 1.00 | 0.12 | 112.00 | 4370 | −0.14 | 0.18 | −0.33 | −0.13 |
| 2 | 2.00 | 0.12 | 126.22 | 4118 | −0.19 | 0.17 | −0.46 | −0.16 |
| 3 | 3.00 | 0.13 | 142.73 | 3866 | −0.21 | 0.17 | −0.42 | −0.17 |
| 4 | 4.00 | 0.13 | 161.27 | 3614 | −0.17 | 0.20 | −0.34 | −0.18 |
| 5 | 5.00 | 0.13 | 182.63 | 3362 | −0.08 | 0.21 | −0.19 | −0.09 |
| 6 | 6.00 | 0.12 | 202.35 | 3110 | −0.04 | 0.09 | −0.10 | 0.00 |
| 7 | 7.00 | 0.12 | 225.67 | 2858 | −0.02 | 0.00 | −0.03 | 0.02 |
| 8 | 8.00 | 0.12 | 250.27 | 2606 | −0.02 | 0.00 | −0.02 | 0.03 |
| 9 | 9.00 | 0.12 | 274.95 | 2354 | 0.00 | 0.00 | 0.01 | 0.05 |
| 10 | 10.00 | 0.11 | 293.32 | 2102 | 0.00 | 0.00 | 0.03 | 0.06 |
| 11 | 11.00 | 0.11 | 308.36 | 1850 | 0.00 | 0.00 | 0.05 | 0.09 |
| 12 | 12.00 | 0.11 | 333.80 | 1598 | 0.00 | 0.00 | 0.07 | 0.09 |
| 13 | 13.00 | 0.11 | 376.53 | 1346 | 0.00 | 0.00 | 0.08 | 0.10 |
| 14 | 14.00 | 0.11 | 417.03 | 1094 | 0.00 | 0.00 | 0.09 | 0.10 |
| 15 | 15.00 | 0.11 | 461.50 | 842 | 0.00 | 0.00 | 0.09 | 0.10 |
| 16 | 16.00 | 0.11 | 516.76 | 590 | 0.00 | 0.00 | 0.09 | 0.10 |
| 17 | 17.00 | 0.11 | 582.06 | 338 | 0.00 | 0.00 | 0.09 | 0.10 |
| 18 | 18.00 | 0.10 | 559.10 | 86 | 0.00 | 0.00 | 0.09 | 0.10 |

Risk tolerance levels can be assigned to various investor risk tolerances. A risk tolerance level of 100% (depicted as the worst case total return in risk-return profile 1100) may be assigned to the most conservative and risk adverse investor. A risk tolerance level of 90% (depicted as the 0.90 total return in the risk-return profile 1300) may be assigned to a moderately conservative investor; a risk tolerance level of 80% to a moderately aggressive investor, a risk tolerance level of 70% to an aggressive investor, and a risk tolerance level of 60% to a very aggressive investor. Those skilled in the art will recognize that other risk tolerance levels may be assigned to quantify the levels of investor risk tolerance.

Risk tolerance levels can be used for example by a firm of financial advisors seeking to define risk tolerance levels consistently throughout the firm. In this way, if an advisor goes on vacation or leaves the firm, another advisor at the firm will have an unambiguous means of knowing the risk tolerance levels of the particular clients that the vacationing or former advisor was working with.

In accordance with another aspect of the invention, a plurality of quantities of interest can be extracted from a risk-return profile of an asset. Such quantities of interest are termed factors and include a maximum drawdown factor and a recoupment time factor. The maximum drawdown factor is the most negative total return for the asset. With reference to FIG. 11, the maximum drawdown factor for the VFINX fund is −0.46 for an asset hold time of two years. The recoupment time factor is the time it takes for the asset to recoup its losses given that there has been an initial loss of asset value from the time the asset was first acquired. The recoupment time factor for the VFINX fund is nine years and thus it will take the unluckiest of investors nine years to recoup his or her losses in the worst case scenario.

In accordance with another aspect of the invention, ratios of factors may be used to compare the performance of two assets. For example, the recoupment time factor for the VFINX fund is nine years. Assuming another asset has a recoupment time factor of three years, a ratio of the recoupment time factors yields a value of ⅓ for the asset relative to the VFINX fund. The ratio of recoupment time factor can thus be used to compare the performance of the assets.

Figure 14:
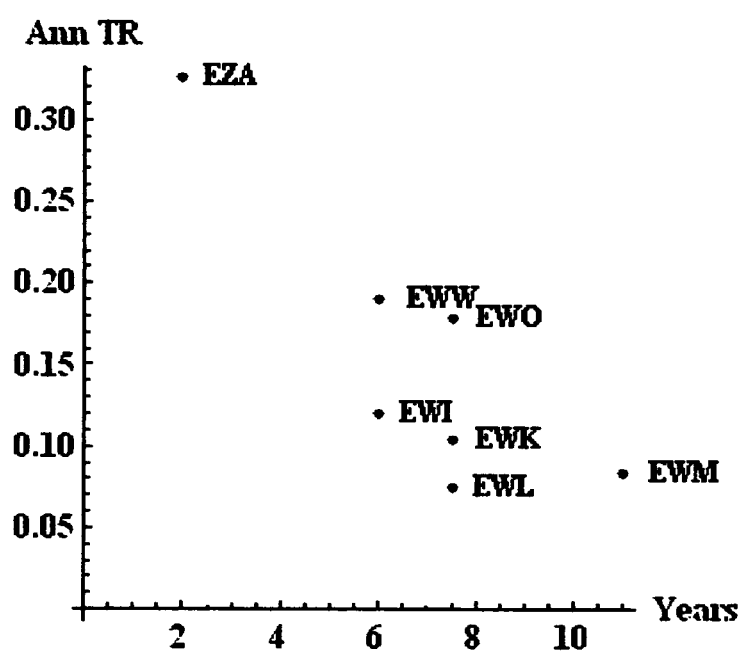
FIG. 14 is a graph showing the overall total returns and recoupment time factors of seven exchange traded funds in accordance with the invention.

In accordance with another aspect of the invention, the metrics of a plurality of assets can be graphed and compared. With reference to FIG. 14, the overall total returns and recoupment time factors of seven exchange traded funds are graphically shown. A numerical representation of the graphs is shown in Table 3. The overall total return of an asset is the average of an asset's annualized total returns for all the intervals in its risk-return profile. Investments in assets having higher overall total returns and shorter recoupment time factors (such as asset EZA) are preferable to investments in assets having lower overall total returns and longer recoupment time factors (such as asset EWM).

TABLE 3

| | AssetName | Symbol | Recoupment Time | Overall TR |
|---|---|---|---|---|
| 1 | Mexico | EWW | 6.00 | 0.19 |
| 2 | Austria | EWO | 7.50 | 0.18 |
| 3 | Malays | EWM | 11.00 | 0.08 |
| 4 | Switzrld | EWL | 7.50 | 0.08 |
| 5 | Belgium | EWK | 7.50 | 0.10 |
| 6 | Italy | EWI | 6.00 | 0.12 |
| 7 | South Africa | EZA | 2.00 | 0.33 |

In accordance with another aspect of the invention, a conditional risk-return profile of an asset can be displayed. Metrics are computed and displayed only upon the occurrence of the condition. For example, it may be useful to know the recoupment time factor following a 20% decline in the value of an asset. If an asset has declined in value by 20%, then the conditional risk-return profile of the asset displays the recoupment time. If the asset has not declined in value by 20%, no data is displayed in the conditional risk-return profile of the asset.

In accordance with another aspect of the invention, metrics of at least two assets can be displayed in a comparison risk-return profile of the assets. For example, a comparison of the mean annualized total returns of the assets as a function of the asset hold times may be displayed. Those skilled in the art will appreciate that other metrics can be similarly and comparatively displayed.

In describing the risk-return profile of an asset, a period of one year has been used. Those skilled in the art will recognize that the duration of the period can be as short as two days and is only limited by the range of the date range set. Furthermore, a risk-return profile does not have to represent all of the data in the date range set. For example, a sub-set of the date range set can be used in making the computations of the disclosed methods. Additionally, the date range set may include any historical data that forms a time series including the total return values for an asset.

Figure 15:
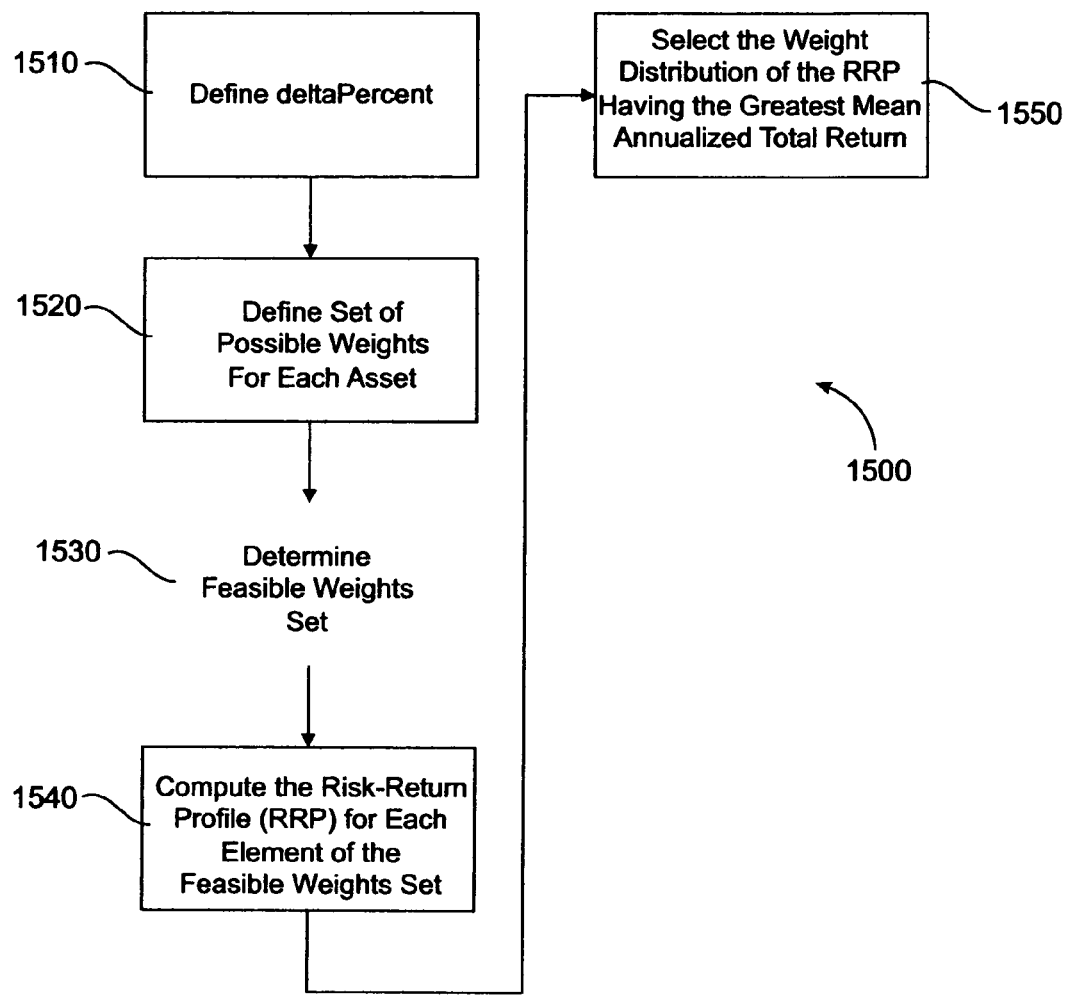
FIG. 15 is a flow chart illustrating a method for optimizing a portfolio of financial assets in accordance with the invention.

In accordance with another aspect of the invention, a method for optimizing a portfolio of financial assets includes computing a risk-return profile for each of a plurality of feasible, weight distributions of financial assets in the portfolio and selecting as the optimal distribution the risk-return profile having the greatest annualized total return. With reference to FIG. 15, a method generally designated 1500 includes a step 1510 in which a delta percentage (hereinafter deltaPercent) is defined. deltaPercent and integer multiples thereof provide the quantitative relationship between the possible weights ($w_i$) assumable by each asset in the portfolio. deltaPercent is constrained to be greater than 0 and less than or equal to 1/n, where n is the number of assets in the portfolio and such that deltaPercent is an integer multiple of 1; that is, for some integer m, m multiplied by deltaPercent=1.

A typical value of deltaPercent for portfolios with no more than 20 assets is 0.05 (5%) providing 20 (m=20) as the integer multiple of 0.05 resulting in 21 possible weights for an asset $w_i$=(0, 0.05, 0.1, 0.15, 0.2 . . . , 1.0). An asset with a weight of 0 is effectively taken out of the portfolio for the purposes of generating the optimized portfolio with the greatest mean annualized total return.

In a step 1520, a set of possible weights (hereinafter PW set) is defined for each asset in the portfolio. The elements of each PW set are all of the possible weights that the asset may have in ascending order. Thus, in the case where deltaPercent=0.05, each PW set has 21 elements and each PW set={0, 0.05, 0.1, 0.15, 0.2 . . . , 1.0}.

From the PW sets, a feasible weights set (hereinafter FW set) is defined in a step 1530. The elements of the FW set are sub-sets $\{w_1, w_2 \ldots, w_n\}$ having elements from each one of the PW sets such that the elements sum to 1. Thus, if there are n assets in the portfolio, the FW set=$\{\{w_1, w_2 \ldots, w_n\}, \{w_1, w_2 \ldots, w_n\}\}$ where $\Sigma w_i=1$ for each sub-set and each sub-set $\{w_1, w_2 \ldots, w_n\}$ is a unique combination of the possible weight distribution of the assets in the portfolio.

By way of example, assume that deltaPercent=0.25 and the portfolio has two assets A and B. The PW set for asset A={0, 0.25, 0.5, 0.75, 1.0} and the PW set for asset B={0, 0.25, 0.5, 0.75, 1.0}. The FW set is then {{0, 1.0}, {0.25, 0.75}, {0.5, 0.5}, {0.75, 0.25}, {1.0, 0}}.

Using the elements of the FW set, in a step 1540 a risk-return profile is computed for each subset of the FW set. Each such risk-return profile comprises a mean annualized total return as previously described. In a step 1550, the weight distribution having the risk-return profile with the greatest mean annualized total return is selected as the weight distribution of the optimized portfolio.

In accordance with another aspect of the invention, the computations performed by the method 1500 may be subject to user-specified constraints. Exemplary constraints include: (a) the maximum drawdown factor not exceeding a given value; (b) the recoupment time factor not exceeding a given time; (c) the weight of a certain asset in the portfolio being constrained to a given range; and (d) any combination of (a)-(c). When one or more constraints are specified, the optimized portfolio is the portfolio with the greatest annualized total return whose risk-return profile does not violate any of the constraints. If the constraints are too narrowly defined, it is possible that no risk-return profile will satisfy the constraints and the user is so advised.

Figure 16:
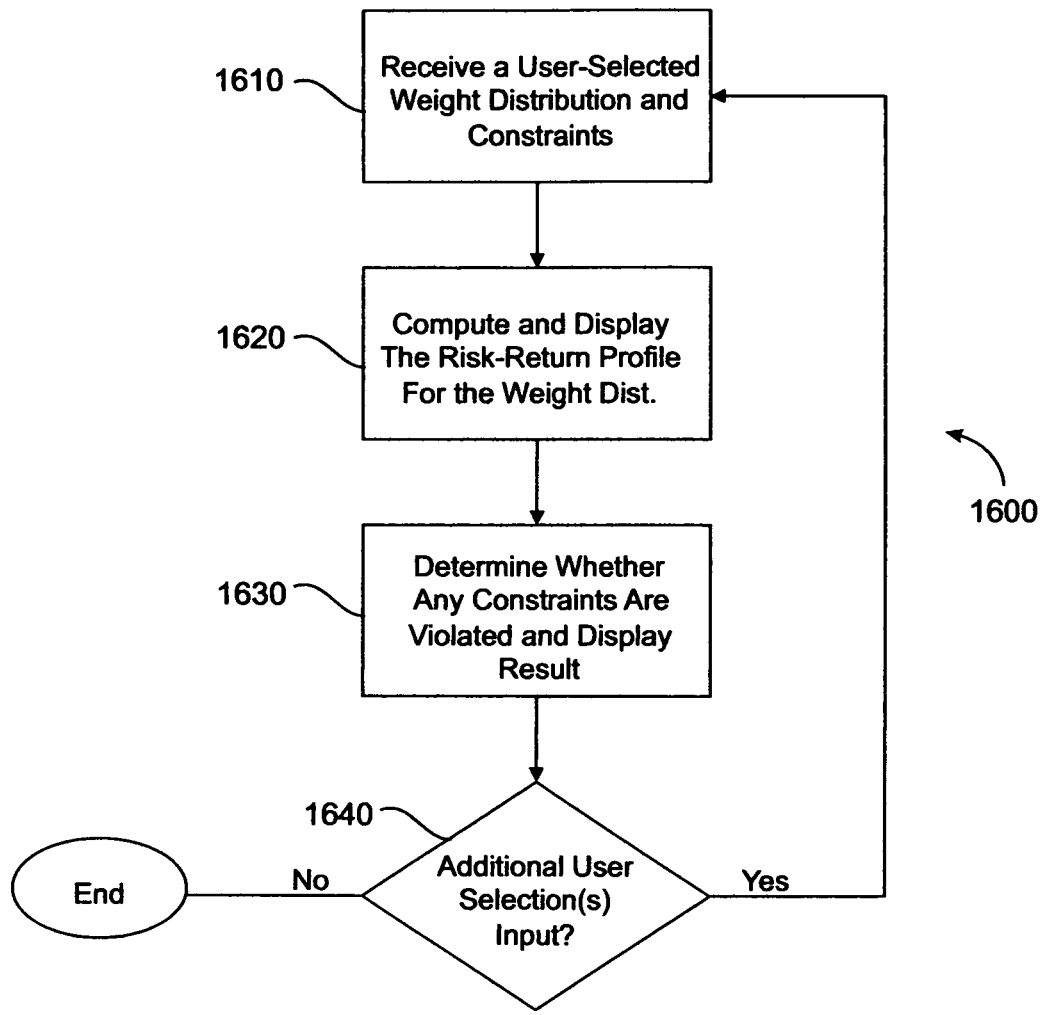
FIG. 16 is a flow chart illustrating a method for real-time design of a portfolio of financial assets in accordance with the invention.

In accordance with another aspect of the invention, a method for real-time design of a portfolio of financial assets is provided whereby a user may change the weight assigned to each of a plurality of assets in a portfolio in real-time in order to observe the risk-return profile of the selected weight distribution and whether or not any constraints are violated. With reference to FIG. 16, a method 1600 includes a step 1610 in which a user-selected weight distribution and any constraints are received. The risk-return profile of the selected weight distribution is then computed and displayed in a user interface in a step 1620. In a step 1630, a determination is made whether any user-selected constraints are violated and the results of the determination displayed in the user interface. Finally, in a step 1640, a determination is made whether additional user-selected weight distributions and/or constraints are input. If additional user input is detected, then the method 1600 returns to step 1610. Otherwise, the method 1600 ends.

Figure 17:
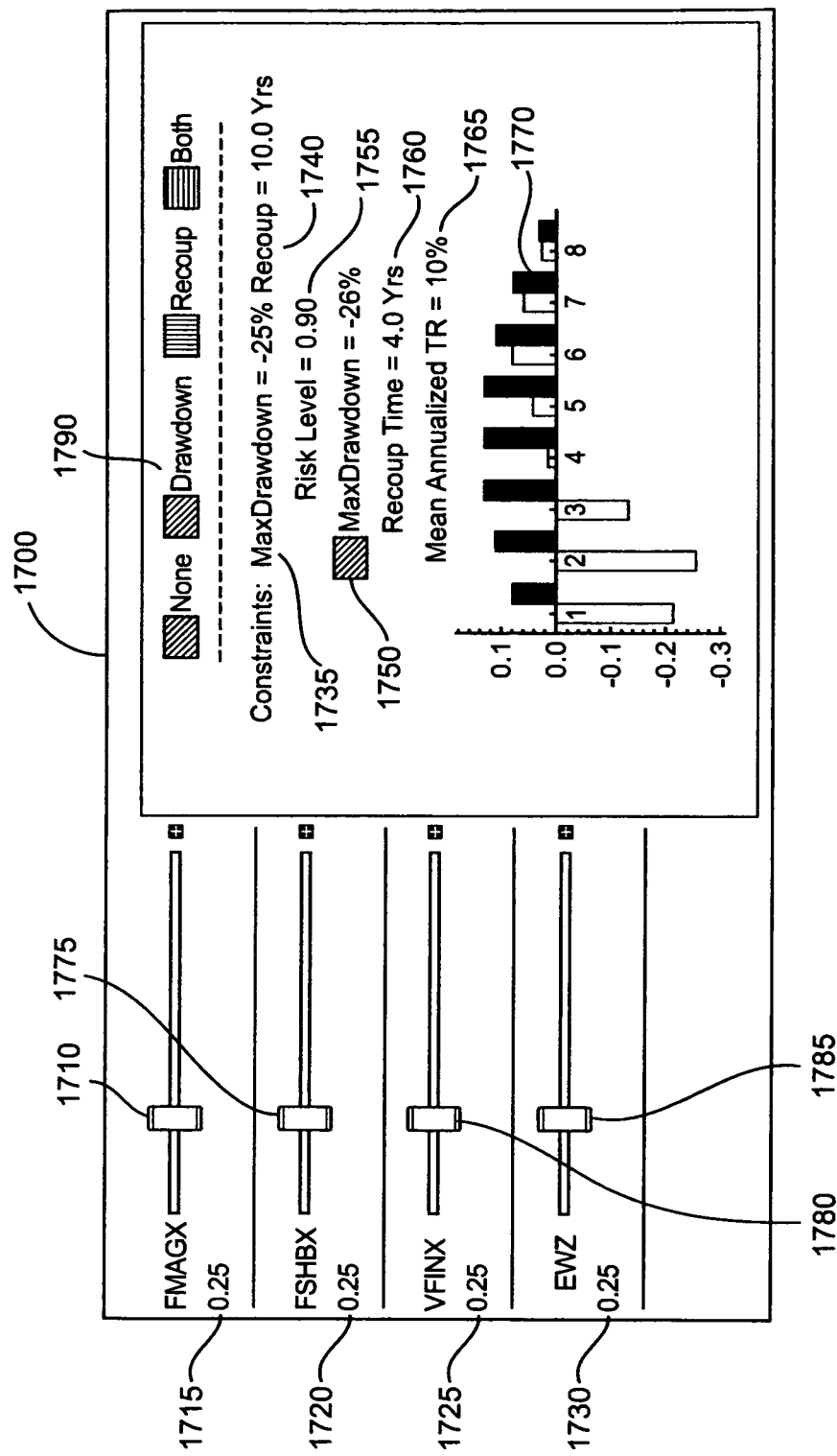
FIG. 17 is a schematic representation of a user interface displaying features of the real-time design in accordance with the invention.

A representative user interface 1700 is shown in FIG. 17 and includes a computed risk-return profile 1710 for an exemplary selected weight distribution wherein each of four assets in a portfolio (FMAGX, FSHBX, VFINX and EWZ) are selected to have equal weights 1715, 1720, 1725 and 1730 of 0.25. User-selected constraints include a maximum drawdown factor 1735 of −25% and a recoupment time factor 1740 of 10 years. As the maximum drawdown factor constraint is violated (MaxDrawdown=−26%), and indication 1750 of the constraint violation together with the maximum drawdown factor value is displayed. Indication 1750 may comprise any of conditions 1790 (maximum drawdown and recoupment time). A risk level 1755, a recoupment time factor value 1760 and a mean annualized total return value 1765 are also displayed.

The user interface 1700 further includes a plurality of sliders 1770, 1775, 1780 and 1785 associated with each of the four assets in the portfolio. Sliders 1770, 1775, 1780 and 1785 enable a user to change and input the weights assigned to each of the four assets in the portfolio (FMAGX, FSHBX, VFINX and EWZ, respectively). In accordance with the method 1600, user changes to the weights assigned to each of the four assets results in a different risk-return profile 1710 being computed and displayed.

The present invention provides a method and apparatus for optimizing a portfolio of financial assets. Methods 1500 and 1600 have complimentary functions for structuring portfolios of financial assets subject to selected constraints. In accordance with the invention, the optimization method 1500 may have a fixed set of user selected constraints while the real-time design method 1600 allows the user to change weight distributions and possibly violate, constraints while still producing the corresponding risk-return profile. As such, the real-time design method 1600 provides a user with a sensitivity analysis of the average annualized total return and other factors such as the maximum drawdown relative to changes in the weight distribution even when constraints may be violated.

The optimization method 1500 does not provide for weight distributions that violate any selected constraints while the real-time design method 1600 does. Following the use of the optimization method 1500, the user may advantageously use the real-time design method 1600 to investigate the tradeoffs between maximizing the mean annualized total return and strictly adhering to the selected constraints. Additionally, using the real-time design method 1600, the user may investigate how the risk-return profile changes while not strictly adhering to the selected constraints.

The real-time design method 1600 also allows the user to investigate the effects on the performance of the portfolio of varying the relative weights of any sub-set of the plurality of financial assets in the portfolio while keeping the weights of the remaining assets constant relative to each other.

In accordance with the invention, the user preferably uses the optimization method 1500 to determine the optimal weight distribution of the financial assets of the portfolio subject to any constraints and then uses the real-time design method 1600 to investigate the consequences of varying the optimized weight distribution when the constraints may be violated.

The foregoing description of the embodiments of the invention has been presented for the purposes of illustration and description. It is not intended to be exhaustive or to limit the invention to the precise form disclosed. Many modifications and variations are possible in light of the above teaching. For example, the value of deltaPercent can be specified on a per-asset basis, the computed and displayed risk-return profile 1710 may include other metrics of interest (such as average negative return for each asset holding time), and other constraints may be selected by the user (such as the average negative return being above a selected value). It is intended that the scope of the invention be limited not by this detailed description, but rather by the claims appended hereto.

I claim:

1. A computer implemented method for optimizing a portfolio of financial assets comprising the steps of:
   (a) defining, in a processing unit of a computing machine, a value delta Percent, wherein delta Percent and integer multiples thereof provide a quantitative relationship between the possible weights assumable by each financial asset in the portfolio;
   (b) defining a set of possible weights for each financial asset in the portfolio;
   (c) determining a feasible weight set from the sets of possible weights, the elements of the feasible weight set including sub-sets having as elements possible weights such that the possible weights sum to 1;
   (d) computing, in the processing unit, a risk-return profile for each element of the feasible weight set; and
   (e) selecting the risk-return profile having the greatest mean annualized total return, wherein the mean annualized total return for each risk-return profile is calculated by (i) computing, in the processing unit, a plurality of holding times for each financial asset, wherein each holding time is an integral number of periods for measuring the return for the financial asset, and wherein each period is within a date range comprising a duration of time for which price data is available for a respective financial asset, (ii) computing, for each holding time of the plurality of holding times, a set of sub-intervals comprising all possible date ranges within the date range of the financial asset that are of a duration of the respective holding time; and (iii) computing, for each set of sub-intervals, an average annualized total return.

2. The computer implemented method of claim 1, wherein delta Percent is constrained to be greater than 0 and less than or equal to 1/n where n is the number of assets in the portfolio, and wherein delta Percent is an integer multiple of 1, that is, for some integer m, m×delta Percent=1.

3. The computer implemented method of claim 2, wherein delta Percent is preferably 0.05 for a portfolio of financial assets having less than 20 assets.

4. The computer implemented method of claim 1, further comprising executing steps (a)-(e) subject to constraint.

5. The computer implemented method of claim 4, wherein the constraint comprises a maximum drawdown factor not exceeding a given value.

6. The computer implemented method of claim 4, wherein the constraint comprises a recoupment time factor not exceeding a given value or to a range of values.

7. The computer implemented method of claim 4, wherein the constraint comprises a weight of a certain asset being constrained to a given value.

8. The computer implemented method of claim 1 further comprising providing a real-time design of a portfolio of financial assets through the steps of:
   (f) receiving a user-selected weight distribution of the financial assets in the portfolio;
   (g) computing and displaying a risk-return profile for the user-selected weight distribution;
   (h) determining whether any one of a plurality of user-selected constraints are violated; and
   (i) displaying the results of step (h) in a user interface.

9. The computer implemented method of claim 8, wherein the user interface comprises a plurality of sliders, each of the plurality of sliders being associated with one of the financial assets and operable to provide the user-selected weight distribution.

10. The method of claim 1 wherein the mean annualized total return of each sub-interval of the plurality of sub-intervals is computed by an exponential function based on the natural logarithm of a total return for the sub-interval plus one, divided by the length of the sub-interval from which one is then subtracted.

11. The method of claim 10 further comprising:
    computing an average negative total return for each of the sub-intervals, wherein the average negative total return comprises the average of the total returns of the sub-intervals having a negative value; and
    computing a worst case total return of each of the sub-intervals.

12. The method of claim 11 further comprising computing a risk tolerance level based on a percentile of all total returns of each of the sub-intervals to generate a plurality of risk tolerance levels.

13. The method of claim 12 wherein the total return for a given percentile comprises 100%–x, where x is the decimal equivalent of the corresponding percentile, and the total return represents the corresponding percentile of all total returns of the sub-intervals for a defined hold time for a specific financial asset of the plurality of financial assets.

14. The method of claim 13 further comprising assigning each risk tolerance level of the plurality of risk tolerance levels to corresponding investor risk tolerances categorized along a qualitative scale of conservative investor to aggressive investor.

15. An apparatus for optimizing a portfolio of financial assets comprising:
    a processor and a display device coupled thereto, wherein the processor in configured to:
    (a) define a value delta Percent, wherein delta Percent and integer multiples thereof provide a quantitative relationship between the possible weights assumable by each financial asset in the portfolio;
    (b) determine a set of possible weights for each financial asset in the portfolio;
    (c) determine a feasible weight set from the sets of possible weights, the elements of the feasible weight set including sub-sets having as elements possible weights such that the possible weights sum to 1;
    (d) compute a risk-return profile for each element of the feasible weight set; and
    (e) select the risk-return profile having the greatest mean annualized total return, wherein the mean annualized total return for each risk-return profile is calculated by (i) computing, in the processor, a plurality of holding times for each financial asset, wherein each holding time is an integral number of periods for measuring the return for the financial asset, and wherein each period is within a date range comprising a duration of time for which price data is available for a respective financial asset, (ii) computing, for each holding time of the plurality of holding times, a set of sub-intervals comprising all possible date ranges within the date range of the financial asset that are of a duration of the respective holding time; and (iii) computing, for each set of sub-intervals, an average annualized total return.

16. An apparatus for providing a real-time design of a portfolio of financial assets comprising:
    a processor and a user interface provided through a display device coupled thereto, wherein the processor is configured to:
    (a) define a value delta Percent, wherein delta Percent and integer multiples thereof provide a quantitative relationship between the possible weights assumable by each financial asset in the portfolio;

(b) determine a set of possible weights for each financial asset in the portfolio;
(c) determine a feasible weight set from the sets of possible weights, the elements of the feasible weight set including sub-sets having as elements possible weights such that the possible weights sum to 1;
(d) compute a risk-return profile for each element of the feasible weight set; and
(e) select the risk-return profile having the greatest mean annualized total return, wherein the mean annualized total return for each risk-return profile is calculated by (i) computing, in the processor, a plurality of holding times for each financial asset, wherein each holding time is an integral number of periods for measuring the return for the financial asset, and wherein each period is within a date range comprising a duration of time for which price data is available for a respective financial asset, (ii) computing, for each holding time of the plurality of holding times, a set of sub-intervals comprising all possible date ranges within the date range of the financial asset that are of a duration of the respective holding time; and (iii) computing, for each set of sub-intervals, an average annualized total return;
(f) receive a user-selected weight distribution of the financial assets in the portfolio;
(g) compute and display a risk-return profile for the user-selected weight distribution;
(h) determine whether any one of a plurality of user-selected constraints are violated; and
(i) display the results of step (h) in the user interface.

* * * * *